United States Patent [19]

Cahan

[11] 3,742,741
[45] July 3, 1973

[54] KEY RECEPTACLE FOR AN AUTOMOTIVE VEHICLE

[76] Inventor: Leslie Lawrence Cahan, 400 Walmer Road, Park Towers West, Penthouse 5, Toronto, Ontario, Canada

[22] Filed: Apr. 3, 1972

[21] Appl. No.: 240,513

[52] U.S. Cl. .............................. 70/63, 70/14, 109/52
[51] Int. Cl. ..... E05b 65/52, E05b 73/00, E05q 1/04
[58] Field of Search ...................... 70/1, 14, 52, 63, 70/158, 159, 160, 179; 109/23, 52

[56] References Cited
UNITED STATES PATENTS 3,236,075 2/1966 Williams ................................ 70/63
3,436,937 4/1969 Barrett .................................. 70/63
3,096,409 7/1963 Hubbell et al. .................. 70/63 UX Primary Examiner—Marvin A. Champion
Assistant Examiner—Richard P. Tremblay
Attorney—Lewis E. Hanley et al.

[57] ABSTRACT

A key receptacle for attachment to an automotive vehicle, in which a housing with a hinged cover has a U-shaped flange with one leg engageable with the housing when the cover is closed. The housing carries a brace with a tongue spaced from the housing and intersecting the other leg of the flange when the flange is engaged with the housing. The flange is reversible in engagement with the housing to provide a hook for attachment to the opened window of the vehicle.

6 Claims, 5 Drawing Figures

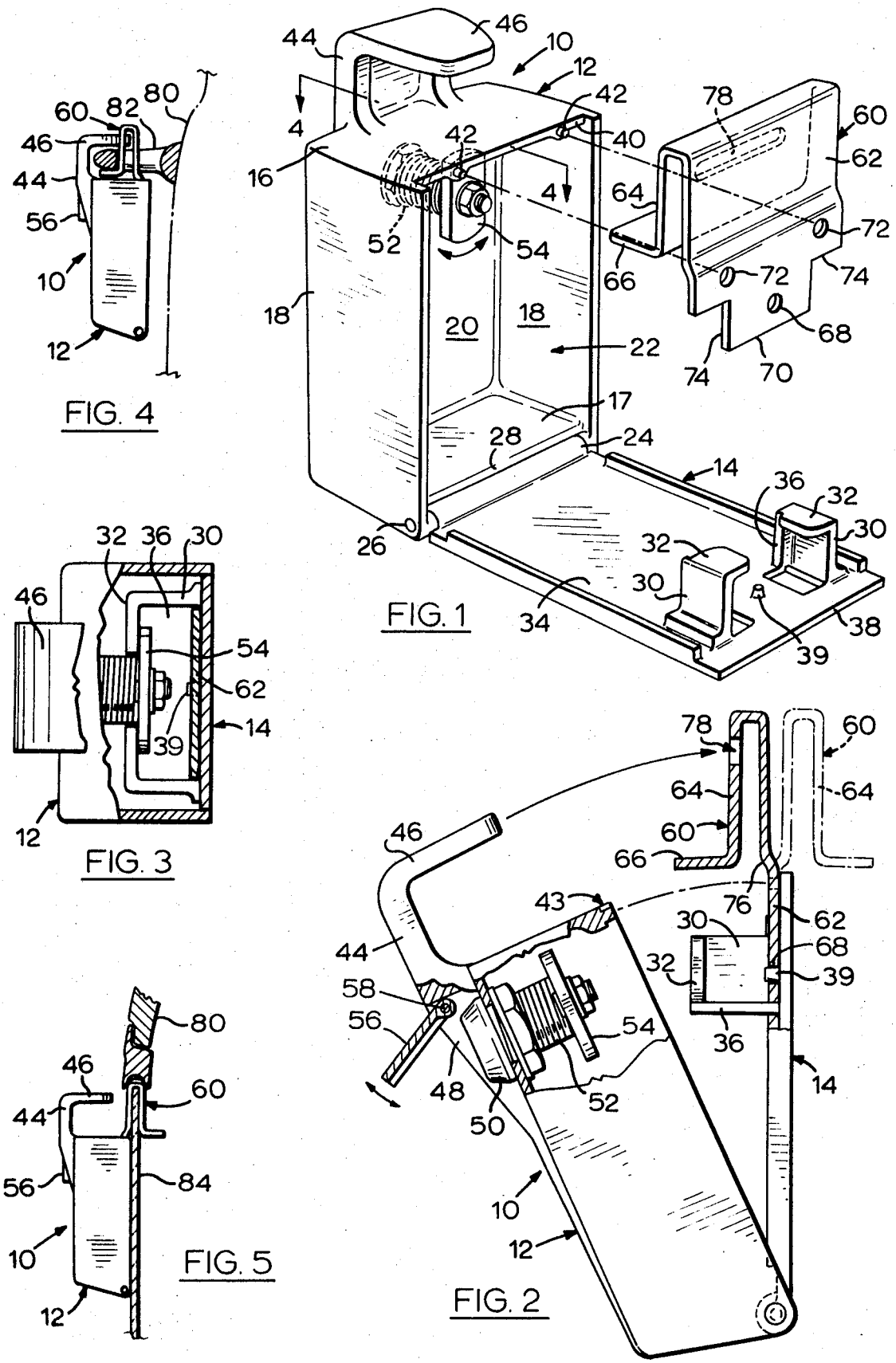

1

KEY RECEPTACLE FOR AN AUTOMOTIVE VEHICLE

The present invention relates to a key receptacle for use with an automotive vehicle.

Recently it has become the practice, in operating sales lots for automobiles and trucks, to keep the keys for a particular vehicle locked in a receptacle attached to the outside of the vehicle, thus saving time, loss, and confusion. Receptacles presently known are attachable to a vehicle door handle but must be adapted, by use of an additional and separate element, for attachment to a vehicle window where the door handle is not shaped to receive the device.

It is an object of the present invention to provide a key receptacle for attachment to an automotive vehicle which is attachable to a door handle or other bridge fixture on the vehicle, or to a window of the vehicle.

An example embodiment of the invention is shown in the accompanying drawings in which:

FIG. 1 is a perspective view showing a receptacle in opened position;

FIG. 2 is a side view, partly broken away, showing the receptacle of FIG. 1 partially opened;

FIG. 3 is a top view, partly in cross-section along line 4—4 of FIG. 1, showing the receptacle of FIG. 1 in closed position;

FIG. 4 is a side view of the receptacle of FIG. 1 attached to a vehicle door handle; and FIG. 5 is a side view of the receptacle of FIG. 1 attached to a vehicle window.

The embodiment of the receptacle shown in the drawings comprises a housing 10 having a hollow, rectangular body portion 12 and a rectangular cover 14. Body portion 12 consists of a pair of opposed upper and lower end walls 16 and 17 respectively, a pair of opposed side walls 18, and a front wall 20 defining a chamber 22. A hinge 24 is integral with the lower end of cover 14 and engages a pin 26 fixed at each end in side walls 18 and lying in a recess 28 in bottom wall 17 of body portion 12. The upper end portion of cover 14 carries a pair of integral, laterally spaced lugs 30 which have inturning end tabs 32 spaced from inner face 34 of the cover and also inturning side shoulders 36 remote from free upper edge 38 of the cover. A boss 39 is located on face 34 of cover 14 between lugs 30.

Upper end wall 16 of body portion 10 has a recess 40 at its edge facing cover 14 and a spaced pair of bosses 42 are upstanding in recess 40. When cover 14 is in closed position on body portion 12, recess 40 provides a slot 43 in housing 10 and bosses 42 abut face 34 of the cover.

A brace 44, integral with front wall 20 of body portion 12, projects outwardly from upper wall 16 and terminates in an inwardly turning tongue 46 spaced from the upper wall. Brace 44 is bifurcated on front wall 20 to form protective shoulders 48 about the face 50 of a barrel lock 52 which projects into the upper portion of chamber 22 and carries a rotatable latch 54. A flap 56 is pivotally hinged by a pin 58 to shoulders 48 of brace 44 to protect face 50 of lock 52.

A flange 60 consists of a U-shaped member having one leg 62 engageable with housing 10 through slot 43 while the other leg 64 is shorter and terminates in an outwardly turning lip 66. Leg 62 has an aperture 68 centered adjacent the lower free edge 70 of the leg and above aperture 68 are a pair of further apertures 72 so

2 located that when boss 39 on cover 14 registers with aperture 68 and the cover is closed onto body portion 12 of housing 10 then bosses 42 in recess 40 will register with apertures 72. The width of flange 60 is slightly less than the length of recess 40 and recesses 74 are formed in the adjacent free edge 70 of leg 62 to accommodate lugs 30, with free edge 70 preferably abutting shoulders 36 of lugs 30 when boss 39 is in registration with aperture 68 of the leg. Also, leg 62 has a transverse crimp 76 above apertures 72. A transverse slot 78 is located in leg 64 of flange 60 to receive tongue 46 when leg 64 faces the tongue and cover 14 is closed.

In the operation of the example embodiment housing 10 is opened by turning latch 54, by means of a key fitting barrel lock 52, to disengage the latch from lugs 30 which allows cover 14 to be opened as shown in FIG. 1. The keys of a particular vehicle 80 are then placed in chamber 22 of body portion 10. If the particular vehicle has a suitable door handle 82, as seen in FIG. 4, flange 60 is located against the inner surface 34 of cover 14 to face inwardly as seen in FIG. 2, with boss 39 registering in aperture 68 and free end 70 of leg 62 resting against shoulders 36 of lugs 30. Flange 60 is then inserted in handle 82 and body portion 12 is brought up against cover 14 (i.e., cover 14 is closed), which registers bosses 42 in apertures 72 of leg 62 and registers tongue 46 of brace 44 in slot 78 of leg 64. Latch 54 is then rotated by the key of lock 52 to engage lugs 30 as seen in FIG. 3, which locks the device on door handle 82 of vehicle 80 as seen in FIG. 4.

If the particular vehicle does not have a suitable door handle, flange 60 is reversed on cover 14 to face outwardly as seen in broken lines in FIG. 2 and the cover is closed as before. Flange 60 is then engageable with the upper edge of a window 84 of the vehicle whereupon the window may be raised to a closed position to prevent removal of the receptacle, as seen in FIG. 5.

I claim:

1. A key receptacle for attachment to an automotive vehicle, comprising:
   a housing having a hollow body portion providing a chamber and a hinged cover providing access to the chamber;
   a brace fixed on the housing and projecting outwardly therefrom, the free end portion of the brace being inturned to form a tongue spaced from the housing;
   a U-shaped flange having one leg non-removably engageable with the housing between the body portion and the cover when the cover is in closed position, the flange projecting outwardly from the housing when engaged therewith, the flange being reversable in engagement with the housing whereby in a first position of the flange the tongue intersects the plane of the other leg and in a second position the flange is engageable with the free edge of an opened window of the vehicle; and
   means mounted on the housing to releasably lock the cover in closed position.

2. A key receptacle as claimed in claim 1 in which a recess is located in the body portion of the housing facing the cover, and at least one boss upstanding in the recess, at least one aperture in said one leg of the flange, said one leg being receivable in the slot formed by the recess and the boss being registrable in the aperture when the cover is in closed position.

3. A key receptacle as claimed in claim 2 including a second boss upstanding from the cover and registrable in a further aperture in said one leg of the flange.

4. A key receptacle as claimed in claim 1 in which the locking means comprises at least one lug fixed on the cover and projecting into the chamber of the housing when the cover is in closed position, and a key actuable latch mounted in the chamber of the housing and movable into engagement with the lug when the cover is in closed position.

5. A key receptacle as claimed in claim 3 including shoulder means upstanding from the cover adjacent said second boss and positioned to abut the flange when the second boss is registered therein.

6. A key receptacle as claimed in claim 1 in which said other leg of the flange has a slot therein and the tongue is received in the slot in said first position of the flange.

* * * * *